United States Patent [19]
Sano et al.

[11] Patent Number: 5,624,771
[45] Date of Patent: Apr. 29, 1997

[54] NON-AQUEOUS ELECTROLYTE CELL

[75] Inventors: Akihiro Sano; Shuichi Nishino, both of Hirakata; Fumio Daio, Kitakatsuragi-gun; Shusuke Oguro, Ikoma; Masatsugu Kondo, Hirakata, all of Japan

[73] Assignee: Matsushita Electric Industrial Co., Ltd., Kadoma, Japan

[21] Appl. No.: 504,324

[22] Filed: Jul. 20, 1995

[30] Foreign Application Priority Data

Jul. 21, 1994 [JP] Japan .................................. 6-169281

[51] Int. Cl.$^6$ .................................. H01M 2/08; H01M 6/14
[52] U.S. Cl. .................................. 429/173; 429/185; 429/194; 429/252; 29/623.2
[58] Field of Search ........................ 429/171, 172, 429/173, 162, 185, 248, 249, 252, 255, 194; 29/623.2

[56] References Cited

U.S. PATENT DOCUMENTS

| | | | |
|---|---|---|---|
| 4,223,079 | 9/1980 | Margalit et al. | 429/194 |
| 4,260,668 | 4/1981 | Lecerf et al. | 429/194 |
| 4,421,834 | 12/1983 | Zupancic | 429/252 X |
| 4,656,104 | 4/1987 | Tucholski | 429/185 |
| 4,911,789 | 3/1990 | Rieunier et al. | 429/252 X |
| 5,198,314 | 3/1993 | Gordy | 429/174 |
| 5,246,795 | 9/1993 | Megahed et al. | |

FOREIGN PATENT DOCUMENTS 60-249256  12/1985  Japan.

*Primary Examiner*—Anthony Skapars
*Attorney, Agent, or Firm*—Ratner & Prestia

[57] ABSTRACT

The present invention provides a general purpose non-aqueous electrolyte cell of high performance, capable of long-term use and/or storage even in high-temperature environments by separating the positive and the negative electrodes with a separator. The separator is made of glass-fiber non-woven cloth having a defined fiber diameter, fiber weight per unit area, and average pore size. The present invention also provides a gasket made of polyphenylene sulfide resin only or substantially of polyphenylene sulfide on which a sealant layer made substantially of blown asphalt is disposed.

20 Claims, 2 Drawing Sheets

NON-AQUEOUS ELECTROLYTE CELL

BACKGROUND OF THE INVENTION

This invention relates to a non-aqueous electrolyte cell using metallic lithium, a lithium alloy, or an intercalation compound formed between lithium and carbon or lithium and metal oxide as the negative electrode and organic electrolyte, capable of being used for long periods and/or being stored in a high-temperature environment.

An organic electrolyte used conventionally in a non-aqueous electrolyte cell has been prepared by dissolving lithium salt as a solute into an organic solvent. This organic electrolyte has been selected because of its high stability in the presence of active metallic lithium and its low melting point.

Because the non-aqueous electrolyte cell has excellent low temperature characteristics, wide operable temperature range, and superior long-period storage characteristics, it has been extensively used as a main power source for various applications such as consumer-use electronic watches, electronic note-books, auto-focus cameras, etc. However, the use of such cells as memory back-up power-supplies in various electronic circuits is now expanding very rapidly. The typical cell systems for these applications can be formed of lithium-graphite fluoride $(Li/(CF)_n)$ and lithium—manganese dioxide $(Li/MnO_2)$ systems.

A typical longitudinal sectional view of a conventional $Li/(CF)_n$ coin-type nonaqueous electrolyte lithium cell is shown in FIG. 1. In FIG. 1, metallic lithium acting as a negative electrode 2 is compressed in one body to the inner surface of cover case 1. Cover case 1 is made of stainless steel and acts as a negative terminal. Gasket 6 is mated on the flange of cover case 1 and molded positive electrode 3 consisting essentially of $(CF)_n$ active material is pressed on a current collector. The current collector is made of titanium lath and connected on the inner surface of bottom case 5. Bottom case 5 is made of stainless steel (SUS 304; containing Cr 15%, Ni 8%) and acts as a positive terminal. Negative electrode 2 and positive electrode 3 are separated by a mat-like separator 4.

The organic electrolyte is impregnated and held within an opening formed in positive electrode 3 and separator 4. The flange of metal case 5 is curled and pressed on the gasket placed between cover case 1 and bottom case 5 in order to seal case 5.

Conventionally, sealant layer 8 consisting essentially of blown-asphalt is disposed in advance at least on a surface region of gasket 6, which is in contact with cover case 1 to improve the sealing between cover 1 and case 5. Conventional $Li/(CF)_n$ system non-aqueous electrolyte lithium cells use a separator made of a polypropylene (PP) non-woven cloth and a gasket consisting essentially of polypropylene (PP) resin. An organic electrolyte prepared by dissolving a solute of lithium fluoborate $(LiBF_4)$ into a high-boiling point solvent such as γ-butylolactone (BL), or into a mixed solvent such as of BL and a low boiling point solvent, such as 1,2-dimethoxyethane (DME), where the solvents are mixed at a ratio yielding a concentration of 1.0 mol/l.

The thermal decomposition temperature of graphite fluoborate employed as a positive active material in the $Li/(CF)_n$ system cell is within a temperature range from 320° to 420° C. and produces no melting deformation when it is used as a negative electrode up to the melting point of metallic lithium which is 180.54° C.

Since the thermal decomposition temperature of lithium fluoride (LiF) (which is a discharge product) is 848° C., the $Li/(CF)_n$ system cell is primarily a thermally stable cell. Thus, long storage periods and/or use of conventional $Li/(CF)_n$ system cells for more than 10 years has been possible within a temperature range of −40° to +60° C.

Because the electrolyte cell is air- and liquid-tight, internal cell-elements such as the electrolyte are prevented from leaking and external elements such as air and moisture are prevented from entering into the cell. The electrolyte cell can be sealed by applying a sealant such as a plastic gasket having high electrolyte resistance and electrical insulation characteristics between the cover case 1 acting as a positive terminal and the bottom case 5 acting as a negative terminal regardless of the type of cells. The cells which may be used include coin-type, button-type, wafer-type, and cylindrical-type cells. In the case of conventional $Li/(CF)_n$ system cells, a long storage period and/or use of more than 10 years is possible if the cell is within a temperature range of −40° to +60° C.

With the recent rapid advancement of electronics technologies, the use of cells for memory back-up has expanded very rapidly. Accordingly, the cell has to withstand more rigorous conditions such as high-temperatures and high humidity conditions produced within the automobile engine compartment or environments in which outdoor industrial equipment is operated.

Moreover, no deterioration of the cell characteristics is permissible when the cell is mounted on a printed circuit board and combined with other electronic components which are exposed to a rigorous high temperature situation such as reflow soldering.

As a non-aqueous electrolyte other than a $Li/(CF)_n$ system, a solvent obtained by mixing propylene carbonate (PC) having a high-boiling point and 1,2-dimethoxyethane (DME) having a low boiling point is used extensively. The purpose of the addition of low boiling point solvent is to lower the viscosity of electrolyte and to improve the high-rate discharge characteristics, including the pulse discharge characteristics.

When a conventional non-aqueous electrolyte cell is subjected to a long storage period and/or used in a high-temperature environment, or a thermal shock of wide temperature difference is applied to the cell, a minute gap may be produced between the cell container and the gasket. If vapor from the low boiling point solvent contained in the organic electrolyte leaks out from the cell, it may cause problems such as a change in the electrolyte composition. In an extreme case, leakage of organic electrolyte and intrusion of external air may form an oxide layer on the surface of the lithium negative electrode due to the moisture contained in the air and causea deterioration of cell characteristics such as an increase in internal resistance.

In order to solve these problems, the development of a cell having improved heat-resistance is essential. In order to accomplish this objective, extensive efforts to improve the heat resistance of organic cell-materials such as the gasket, sealant, separator, etc., including the composition of electrolyte, have been made. For example, U.S. Pat. No. 5,246,795 and Japanese Patent Publication Hei 5-58232 show proposals included in these efforts, but the practical effects of these efforts are not satisfactory.

Furthermore, $Li/SOCl_2$ system cells employing thionyl chloride ($SOCl_2$; a strong oxidant) and corrosive liquid as the positive active material were developed which had a hermetically sealed construction. This system used a separator made of a glass fiber non-woven cloth and a cover on which the positive terminal was sealed by laser welding it (glass to metal) to the top edge of negative polarity case.

However, in the Li/SOCl$_2$ system cells, the separator between the positive and negative electrodes is a layer of lithium chloride (LiCl on the surface of lithium) formed by the contact of the lithium negative electrode to the SOCl$_2$. The glass fiber non-woven cloth should be called a spacer rather than a separator because of the large pore size of non-woven cloth.

Thus, if used as a separator in other cell systems internal short-circuits could easily take place, so that it would be unsuitable for such use. Although the hermetical seal accomplished by the glass-to-metal seal is highly reliable, these spacers cannot be produced at a fast rate and the cost is high so that the extensive use of these in general purpose cells is considered impractical.

SUMMARY OF THE INVENTION

Because of the high-melting point of polypropylene (PP) resin used in the separator and gasket of conventional Li/(CF)$_n$ system non-aqueous electrolyte cells, PP has been used as a general purpose resin where high heat-resistance is required. Although the PP resin can continuously withstand low-load conditions at 110° C., and can be used at a temperature of 150° C. at a no load condition, deformation due to cold-flow even at a temperature below 100° C. is possible when subjected to high-load such as when used as a gasket. Thus, deformation may occur when the cell is subjected to a long storage period and/or used at a temperature exceeding 60° C.

The present invention relates to a non-aqueous electrolyte cell where the positive and the negative electrodes are separated by a separator made of non-woven glass fiber sheet having a fiber diameter less than 2.0 μm, a fiber weight per unit area 5.9 to 9.0 g/m$^2$, and an average pore size in a range 3.0 to 7.5 μm. A gasket made of a polyphenylene sulfide resin coated with a sealant layer consisting essentially of blown asphalt, or a resin consisting essentially of polyphenylene sulfide is disposed between the cover case of positive polarity and the bottom case of negative polarity. The upper flange of either metal case is curled to compress the gasket, and seal against the other metal case.

One objective of the present invention is to provide a general purpose Li/(CF)$_n$ non-aqueous electrolyte cell of high reliability, capable of long term use and/or storage at high temperatures by using components of high-heat resistance, and a suitable cell construction.

A second objective of the invention is to expand the use of non-aqueous electrolyte cells regardless of whether the cells are used as primary or secondary cells.

DETAILED DESCRIPTION OF THE INVENTION (EXAMPLES)

Detailed descriptions of several examples of the invention are provided below by referring to the attached drawings, figures, and tables.

(Example-1)

Various gaskets made of heat-resistant resins and designed for a Li/(CF)$_n$ system Model No. BR1225 cell (having an outer diameter of 12.5 mm and a overall height of 2.5 mm) are prepared by injection mold. A volume of 100 ml of electrolyte prepared by dissolving LiBF$_4$ into a γ-butylolactone (BL) solvent at a concentration of 1.0 mol/l. is poured into a wide-mouthed testing bottle in which 10 gaskets made of various resins were placed. After the bottle is tightly sealed, the bottle is stored for a period of 40 days at a temperature of 150° C.

The electrolyte resistance characteristics of these gaskets was then determined from visual inspection and the resistance-changes were observed. The results are shown in Table 1.

TABLE 1

| No. | Kinds of Resin | Electrolyte Resistance Test |
|---|---|---|
| 1. | Polyphenylene sulfide (PPS) | Unchanged |
| 2. | Polyether ketone (PEK) | Unchanged |
| 3. | Polyetherether ketone (PEEK) | Unchanged |
| 4. | Polyether sulfone (PES) | Dissolved |
| 5. | Polysulfone (PSu) | Dissolved |
| 6. | Polyamide imide (PAI) | Dissolved |
| 7. | Polyether imide (PEI) | Dissolved |

Table 1 shows unfavorable electrolyte resistance characteristics of polyether sulfone (PES), polysulfone (PSu), polyamide imide (PAI), and polyether imide (PEI) resins. In contrast, favorable electrolyte characteristics are shown for polyphenylene sulfide (PPS), polyether ketone (PEK), and polyetherether ketone (PEEK) resins. The gasket made of polyetherether ketone (PEEK) resin was proposed in the above-mentioned U.S. Pat. No. 5,246,795.

Cells according to the present invention were prepared including a separator made of glass fiber non-woven cloth, instead of PP fiber non-woven cloth and gaskets made of PPS resin, which has excellent electrolyte resistance characteristics. See Tables 2 and 3, column 1. BR1225 type Li/(CF)$_n$ system coin-cells (having a nominal capacity of 48 mAh) using gaskets made of PEK or PEEK resins were prepared for comparison. See Tables 2 and 3, columns 2 and 3.

Figure 1:
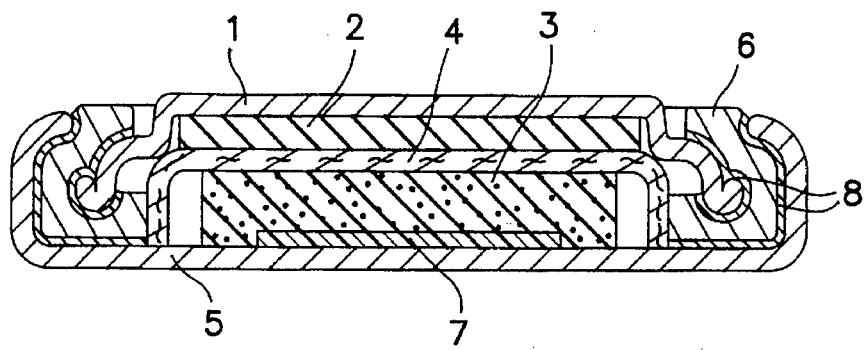
FIG. 1 shows a longitudinal sectional view of the typical conventional Li/(CF)$_n$ system coin-type non-aqueous electrolyte cell.

In each case, at least the surfaces of these gaskets which contact the cell cover case and the bottom case were precoated with a paint. The paint is prepared by dissolving blown-asphalt and a mineral oil into a solvent. The paint is then dried in order to form a sealant layer consisting essentially of blown-asphalt. In addition to these components, the materials and components are the same as those shown in FIG. 1, except a separator, gasket, and sealant according to the present invention are used.

The glass fiber non-woven cloth is made of glass fiber having a fiber diameter of less than 2.0 μm, fiber weight per unit area of 5.9 to 9.0 g/m$^2$, and an average pore size of 3.0 to 7.5 μm. A high-temperature storage test for a period of 40 days at 150° C., and a tropical storage test for a period of 40 days at a condition of 60° C. and 90% relative humidity (RH), were conducted for 50 cells using each gasket material.

During these tests, the open-circuit voltages and the internal impedances of all the cells were measured (at AC 1000 Hz) once every 10 days after the cell conditions were brought back to a condition of ordinary temperature and humidity, and all of these values were averaged. Results of these tests are shown in Tables 2 and 3.

TABLE 2

| | Cell No. | | | | | |
|---|---|---|---|---|---|---|
| | 1 | | 2 | | 3 | |
| | Kinds | | | | | |
| | Invention (PPS) | | Comparison-1 (PEK) | | Comparison-2 (PEEK) | |
| Storage Days | O.C.V.[1] (V) | Internal Impedance (Ω) | O.C.V. (V) | Internal Impedance (Ω) | O.C.V. (V) | Internal Impedance (Ω) |
| 0 | 3.40 | 45 | 3.40 | 45 | 3.40 | 45 |
| 10 | 3.40 | 80 | 3.39 | 82 | 3.38 | 85 |
| 20 | 3.40 | 115 | 3.38 | 120 | 3.37 | 126 |
| 30 | 3.38 | 125 | 3.37 | 131 | 3.36 | 139 |
| 40 | 3.37 | 140 | 3.36 | 146 | 3.36 | 153 |

Note:
[1]O.C.V. means open-circuit voltage.

TABLE 3

| | Cell No. | | | | | |
|---|---|---|---|---|---|---|
| | 1 | | 2 | | 3 | |
| | Kinds | | | | | |
| | Invention (PPS) | | Comparison-1 (PEK) | | Comparison-2 (PEEK) | |
| Storage Days | O.C.V.[1] (V) | Internal Impedance (Ω) | O.C.V. (V) | Internal Impedance (Ω) | O.C.V. (V) | Internal Impedance (Ω) |
| 0 | 3.40 | 45 | 3.40 | 45 | 3.40 | 45 |
| 10 | 3.40 | 51 | 3.39 | 94 | 3.21 | 101 |
| 20 | 3.40 | 63 | 3.37 | 238 | 3.15 | 247 |
| 30 | 3.40 | 72 | 3.36 | 388 | 3.10 | 496 |
| 40 | 3.39 | 86 | 3.34 | 541 | 3.00 | 683 |

Note:
[1]O.C.V. means open-circuit voltage.

Although the results in Tables 2 and 3 show gradual decreases in open-circuit voltages and gradual increases in internal impedances of all the cells tested under a high temperature and humidity condition as the number of storage days increased, the decrease in open-circuit voltage and the increase in internal impedance of No. 1 type cells according to the present invention using gaskets made of PPS resin show smaller decreases in open-circuit voltages and smaller increases in internal impedances as compared to conventional cells. These results show that cells according to the present invention performed better than conventional cells.

(Example-2)

Since the performance of gaskets made of PPS resin have been shown to be excellent, the possibility of improving the structural stability of gaskets made of PPS resin added to glass fiber was tested.

In these experiments, PPS resins uniformly blended with glass fiber at 5, 10, 15, and 20 wt % were prepared. Gaskets made of each of these resins were prepared by an injection molding method. Then, one hundred BR1225 type Li/(CF)$_n$ system coin-cells at each wt % using these gaskets were prepared under the conditions described in Example-1. Any leakage from each group of 100 cells was examined after the cells were repeatedly subjected to a cyclic temperature test. The test included subjecting the cells alternatingly to one hour storage conditions at −10° C. and +60° C. The cycle was repeated 60 times. The cells were then brought back to ordinary temperature and humidity for evaluation. Results of these experiments are shown in Table 4.

TABLE 4

| Cell No. | Glass Fiber Content (wt %) | Number of Leaked Cells |
|---|---|---|
| 1 | 0 | 0/100 |
| GF-1 | 5 | 0/100 |
| GF-2 | 10 | 0/100 |
| GF-3 | 15 | 25/100 |
| GF-4 | 20 | 45/100 |

Table 4 shows that the addition of glass-fiber as a filler was effective only up to 10% by weight of the glass fiber. Leakage of electrolyte was caused by fine cracks produced by thermal shock of the surface of crimp-sealed gaskets which became brittle when the amount of fiber-glass added is excessively high.

(Example-3)

The effect of adding glass-fiber (as a filler) to PPS resin in gaskets to increase material hardness was shown in Example-2. BR1225 type Li/(CF)$_n$ system coin-cells of Example-3 were prepared under the same conditions as described in Example-1, but using injection molded gaskets made of a resin obtained by adding polyethylene (PE) or polypropylene (PP), acting as an elastomer, to the PPS resin. The weight ratio PE or PP, to PPS resin was 2, 4, 8, 10, 12, or 15 wt %. The number of leaking cells after the cyclic-thermal-shock tests, as described above with respect to Example-2, were observed. Results of these experiments are shown in Table 5.

TABLE 5

| Cell No. | Elastomer Content | (wt %) | Number of Leaked Cells |
|---|---|---|---|
| 1 | | 0 | 0/100 |
| PE-1 | PE | 2 | 0/100 |
| PE-2 | | 4 | 0/100 |
| PE-3 | | 6 | 0/100 |
| PE-4 | | 8 | 0/100 |
| PE-5 | | 10 | 0/100 |
| PE-6 | | 12 | 1/100 |
| PE-7 | | 15 | 5/100 |
| PP-1 | PP | 2 | 45/100 |
| PP-2 | | 4 | 0/100 |
| PP-3 | | 6 | 0/100 |
| PP-4 | | 8 | 0/100 |
| PP-5 | | 10 | 0/100 |
| PP-6 | | 12 | 1/100 |
| PP-7 | | 15 | 4/100 |

Table 5 clearly shows that the cells using gaskets made of PPS resin to which PE or PP acting an elastomer was added up to 10 wt % can withstand the cyclic thermal-shock test conducted in a wide range of temperatures. Although not shown here, the same effect can be obtained by using an elastomer in which PE and PP are equally mixed so long as the weight ratio of the combined elastomer is less than 10 wt %. In another words, PE and/or PP, which are typical polyolefin elastomers are each as effective as a PPS resin elastomer if the combined weight percent of the added elastomer(s) is 10 wt % or less.

(Example-4)

The heat-resistance of non-aqueous electrolyte cells can be remarkably improved by using a gasket made only of PPS resin, or PPS resin to which glass-fiber (acting as a filler) is blended at a weight ratio less than 10 %, or to which a polyolefine system elastomer including PE and/or PP is uniformly blended.

The sealing of the cell should depend on the holding rate of gasket thickness (defined below) when a gasket is inserted between a metal case of positive polarity and a metal case of negative polarity. These metal containers am bonded together by applying a pressure on the gasket by curling the upper edge of either metal case. The holding factor of gasket thickness is expressed by the following equation:

$$\text{Holding rate (\%) of gasket thickness} = \frac{\text{Gasket thickness at the sealing portion after sealing}}{\text{Gasket thickness at the sealing portion with no applied load}} \times 100$$

BR1225 type Li/(CF)$_n$ system coin-cells were prepared by using the components and materials as described above in Example-1 according to the present invention, except the thickness of the gaskets made of PPS resin was varied. The cells were subjected to holding rates of gasket thickness of 30, 40, 50, 70, 90 and 95%. The cells were subjected to a cyclic thermal-shock test, as described above, and were examined afterward for any leakage. Results of these experiments are shown in Table 6.

TABLE 6

| Cell No. | Holding Rate of Gasket Thickness (%) | Number of Leaked Cells |
|---|---|---|
| C-1 | 30 | 25/100 |
| C-2 | 40 | 10/100 |
| C-3 | 50 | 0/100 |
| C-4 | 70 | 0/100 |
| C-5 | 90 | 0/100 |
| C-6 | 95 | 15/100 |

Table 6 shows poor leakage performances of Cell Nos. C-1, C-2 and C-6 which had holding rates of gasket thickness set at 30, 40, and 95%, respectively. Among these cells, those having holding rates of 30 and 40% had gaskets which became too thin at the sealing portion because of too high a load applied on the gasket at sealing. The high load caused the gasket to lose the necessary gasket characteristics and resulted in decreased sealing performance.

Gasket C-6, having a holding rate of gasket thickness of 95%, possibly experienced poor performance due to a low sealing pressure. Therefore, when the cells were sealed by a gasket made of PPS resin, the holding rate of gasket thickness should be in a range of about 50 to 90%.

Moreover, although not shown here, a case where a glass-fiber filler or polyolefine system elastomer is added and blended uniformly with a PPS resin at a ratio less than 10 wt %, it was confirmed that holding rate of gasket thickness for such gaskets also should be in a range of 50 to 90% as for the gaskets made of PPS resin only.

(Example-5)

Fifty BR1225 type Li/(CF)$_n$ system coin-cells using a gasket made of PPS resin as described above in Example-I (see Table 7, column 1) and 50 cells using a conventional separator made of a PP fiber non-woven cloth (see Table 7, Column 4) were prepared. The cells were subjected to a 40 day high-temperature storage test at 150° C. like in Example-1. The open-circuit voltages and the internal impedances (at AC 1000 Hz) of the cells during the high-temperature storage test period were measured and averaged. The results are shown in Table 7.

TABLE 7

| | Cell No. | | | |
|---|---|---|---|---|
| | 1 | | 4 | |
| | Kinds | | | |
| | PPS Glass Fiber Non-Woven Cloth | | Conventional PP-Fiber Non-Woven Cloth | |
| Storage Days | Open-Circuit Voltage (V) | Internal Impedance (Ω) | Open-Circuit Voltage (V) | Internal Impedance (Ω) |
| 0 | 3.40 | 45 | 3.40 | 45 |
| 10 | 3.40 | 80 | 3.40 | 100 |
| 20 | 3.40 | 115 | 3.15 | 350 |
| 30 | 3.38 | 125 | 3.00 | 600 |
| 40 | 3.37 | 140 | 2.80 | 850 |

Table 7 shows both remarkable decreases of the open-circuit voltage and remarkable increases of the internal impedance of cells using the PPS resin gasket of high-heat resistance and the cells using a separator made of conventional PP-fiber non-woven cloth as the number of days stored at high-temperature increased.

In the cells prepared by employing separators made of conventional PP-fiber non-woven cloth, the separators were found in a half-molten condition after the test. The cells turned into a film-formed shape which caused a blinding of the separator. Furthermore, it was reconfirmed that glass fiber non-woven cloth acting as a separator was unstable.

(Example-6)

Although the possibility of a Li/(CF)$_n$ system non-aqueous electrolyte cell having excellent heat resistance and anti-thermal shock characteristics has been proved by Examples 1 to 5, the fiber diameter of glass fiber non-woven cloth used as the separator has to be determined.

One hundred BR1225 type Li/(CF)$_n$ system coin-cells using gaskets made of PPS resin and the other components (as described above with respect to Cell No. 1 in Example-1, except for the separator) were prepared. The average fiber diameter of glass-fiber non-woven cloth was varied as follows: 0.3, 0.5, 1.0, 1.5, 2.0, 2.5, and 3.0 μm.

In each cell the glass-fiber non-woven cloth had a fiber weight per unit area within a range of 5.0 to 9.0 g/m$^2$ and an average pore size of 3.0 to 7.5 μm. A glass-fiber non-woven cloth having a fiber diameter less than 2.0 μm as used in Cell No. 1, was consistently used.

To evaluate the electrolyte absorption and holding characteristics of the separator in each cell, the number of leaking cells was counted after electrolyte of a predetermined volume was added and then sealed as in the last example. After this, a a constant resistance load of 30 k Ω was applied. A continuous discharge test attaining an end voltage of 2.5 V at 20° C. was then conducted by using 20 cells of each fiber diameter. The averages of the discharge durations were determined. The results of these tests are shown in Table 8.

TABLE 8

| Cell No. | Fiber Diameter (μm) | | Number of Leaked Cells After Sealing | Discharge Duration (hours) |
|---|---|---|---|---|
| 1 | less than Average | 2.0 | 0/100 | 506 |
| GS-1 | less than Average | 0.3 | 0/100 | 506 |
| GS-2 | less than Average | 0.5 | 0/100 | 505 |
| GS-3 | less than Average | 1.0 | 0/100 | 505 |
| GS-4 | less than Average | 1.5 | 0/100 | 506 |
| GS-5 | less than Average | 2.0 | 1/100 | 503 |
| GS-6 | less than Average | 2.5 | 20/100 | 470 |
| GS-7 | less than Average | 3.0 | 80/100 | 425 |

Table 8 shows an increased number of leaking cells, and at the same time, an increased number of cells showing decreased discharge durations caused by the decreased electrolyte volume in the cells found when glass fiber having an average fiber diameter of more than 2.0 μm was employed. The results show that the fiber diameter of glass-fiber non-woven cloth is optimum when it is less than 2.0 μm, and that the average fiber diameter should preferably be in a range from 0.3 to 1.5 μm.

The glass-fiber non-woven cloth having an average fiber diameter of less than 3.0 μm is generally associated with increased cost and low mechanical strength. The low mechanical strength causes easy tearing and difficulty in handling the cloth. Such characteristics would be disadvantageous if the cloth were used as a separator.

Non-woven cloth having mechanical strength based on a fiber-weight per unit area of less than 5.0 g/m$^2$ is low. This is disadvantageous if the cloth is used as a separator. Also, both the absorption rate of the electrolyte and the electrolyte holding characteristics are low for the cloth having a fiber-weight per unit area more than 9.0 g/m$^2$. These characteristics are also disadvantageous if the cloth is to be used as a separator.

Moreover, when the average pore size of cloth is less than 3.0 μm, the electrolyte holding characteristics are poor as in the case of excessively heavy fiber weight per unit area. Thus, such cloth can hardly be used practically. On the other hand, with a glass-fiber non-woven cloth having an average pore size of more than 7.5 μm, internal short circuits may readily take place such that the cloth cannot function as separator satisfactorily.

Therefore, the glass-fiber non-woven cloth having a fiber diameter less than 2.0 μm, or preferably having an average fiber within range of 0.3 to 1.5 μm; a fiber weight per unit area within 5.0 to 9.0 g/m$^2$; and an average pore size within a range of 3.0 to 7.5 μm should be used as a suitable separator to improve the heat-resistance of Li/(CF)$_n$ system nonaqueous electrolyte cells.

Like in Li/(CF)$_n$ system cells, the separators made of non-woven cloth formed into a mat-like form cannot be used in the non-aqueous electrolyte cells. Like the Li/MnO$^2$ system cylindrical cells employing a coil-shaped electrode group and various lithium secondary batteries, a separator made of micro-porous PE and/or PP membrane is currently used by various cell systems.

In these cases, the heat-resistance of the cell can be improved substantially by using a separator obtained by piling the micro-porous membrane on the glass fiber non-woven cloth, or by sandwiching the micro-porous membrane between the two sheets of glass-fiber non-woven cloth.

Summarizing those embodiments described above, the present invention is used to separate the positive and the negative electrodes with a separator made of glass-fiber non-woven cloth having a fiber diameter of less than 2.0 μm, preferably an average fiber diameter within 0.3 to 1.5 μm; fiber weight per unit area within 5.0 to 9.0 g/m²; and an average pore size within a range of 3.0 to 7.5 μm. A gasket made of polyphenylene sulfide resin or resin consisting essentially of polyphenylene sulfide on which a sealant layer made of blown asphalt is coated, is placed between a metallic container of positive polarity and a metallic container of negative polarity. The upper flange of either metallic container is curled by applying pressure on the gasket in order to connect and combine these containers. The non-aqueous organic electrolyte cell is formed using a negative electrode made of a Li/(CF)$_n$ system, light metal such as lithium, an alloy made of light metal such as lithium, or an intercalation compound formed between an alkaline metal such as lithium and a carbon or metal oxide. By selecting a suitable active material for the positive electrode, and combining the positive electrode with the negative electrode, these technologies may be used with cells of various types.

(Example-7)

An organic electrolyte obtained by dissolving a solute of LiBF$_4$ into a Y-butylolactone (BL) solvent at a concentration of 1.0 mol/l. has been consistently used in Li/(CF)$_n$ system non-aqueous electrolyte cells shown in Examples 1–6. However, a solvent having better operating characteristics at high temperature is sought.

Table 9 shows a list of melting points (or freezing points) and boiling points of several solvents having high-boiling points and which are suitable organic electrolytes.

TABLE 9

| Solvent | Melting Point (°C.) | Boiling Point (°C.) |
| --- | --- | --- |
| Propylene carbonate (PC) | −49.0 | 241.0 |
| γ-butylolactone (BL) | −43.0 | 202.0 |
| Ethylene glycolsulfite (EGS) | −11.0 | 173.0 |
| Dimetyl sulfoxide (ENSO) | 18.6 | 189.0 |
| Sulfolan (SL) | 28.9 | 287.3 |
| Ethylene carbonate (SC) | 40.0 | 248.0 |

Considering a practical low temperature operation of non-aqueous electrolyte cell at a temperature of at least −20° C., the possible solvent can only be propylene carbonate (PC) or γ-butylolactone(BL). Thus, BR1225 type Li/(CF)$_n$ system non-aqueous electrolyte coin-cells, such as Cell No. 1 in Example 1, were prepared by using solvents prepared by mixing PC and BL at various mixing ratios, and by using an organic electrolyte prepared by dissolving a solute of LiBF$_4$ into a solvent obtained by mixing 1,2 dimethoxyethane (DME) of low-boiling point and BL, or a mixed solvent at a concentration of 1.0 mol/l.

These cells were then tested in a continuous 30 kΩ constant resistor discharge up to a degree of discharge of 40% in a temperature range of −40° to 85° C. The respective operating voltages at a degree of discharge of 40% were determined and compared.

Figure 2:
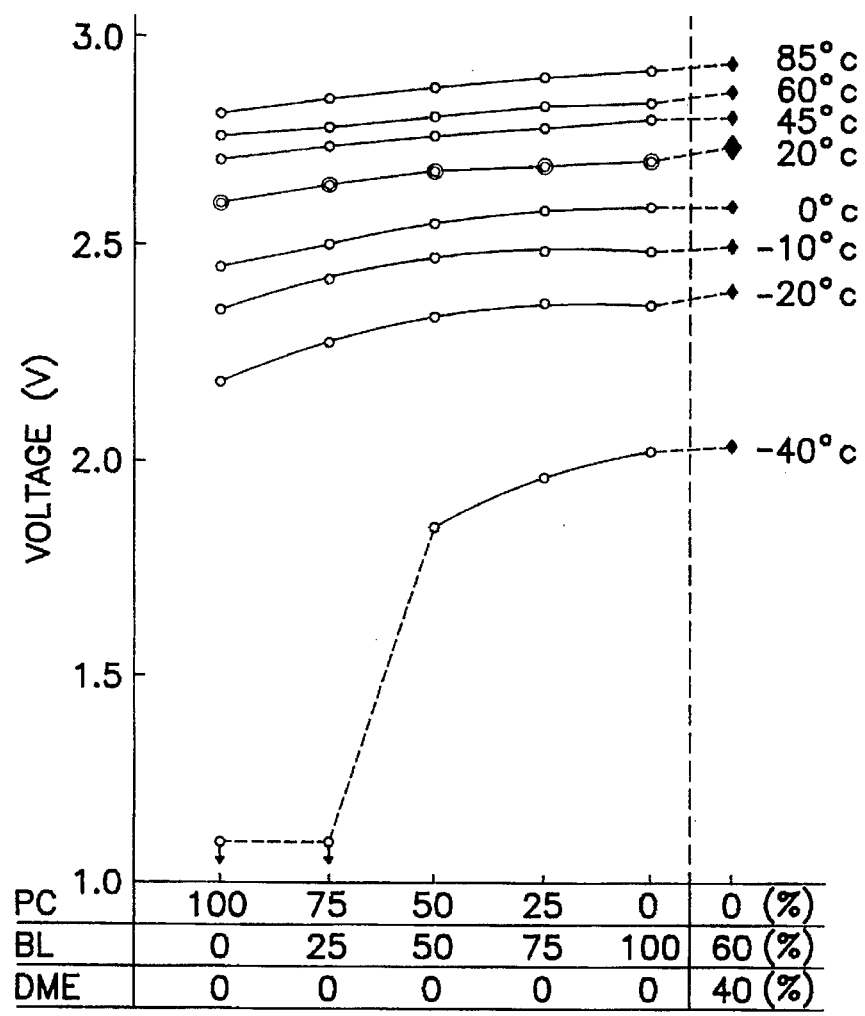
FIG. 2 is a graph showing a relationship between the mixing rate of solvent contained in the electrolyte and the operating voltage of a cell where the degree of discharge at 40% is observed at various temperatures.

The results are shown in FIG. 2. FIG. 2 shows that the performance of cells using the organic electrolyte prepared by using a mixed solvent consisting essentially of PC and BL (but containing much more BL than PC), or consisting essentially of BL, can be approximated to that of cells using the organic electrolyte prepared by mixing a low-boiling point DME solvent mixed with BL. Therefore, Li/(CF)$_n$ system non-aqueous electrolyte cells capable of long periods of use and/or storage under a high-temperature condition can readily be realized even without adding a low-boiling point solvent.

(Example-8)

In the above examples of the present invention, the concentration of the solute (LiBF$_4$) of the organic electrolyte of the Li/(CF)$_n$ system cells has been fixed at a 1.0 mol/l. By using the organic electrolyte dissolved into a BL solvent alone, LiBF$_4$ solute concentrations of 0.8, 0.9, 1.0, 1.3, 1.5, and 1.6 mol/l can be obtained. Fifty BR1225 type Li/(CF)$_n$ system coin-cells of each concentration were prepared as described above with respect to Cell No. 1 in Example 1.

The cells were subjected to a high-temperature 40-day storage test, and the changes of internal impedances (at 1000Hz AC) during that testing period were observed. The averages of internal impedances are shown in Table 10.

TABLE 10

| | | Cell No. | | | | | |
| --- | --- | --- | --- | --- | --- | --- | --- |
| | | S-1 | S-2 | 1 | S-3 | S-4 | S-6 |
| | | LiBF$_4$ Solute Concentration (mol/l) | | | | | |
| | | 0.8 | 0.9 | 1.0 | 1.3 | 1.5 | 1.6 |
| Internal Impedance (Ω) | Before storage | 48 | 46 | 45 | 45 | 46 | 47 |
| | storage 10 days | 156 | 83 | 80 | 82 | 84 | 125 |
| | 20 days | 318 | 116 | 115 | 118 | 119 | 284 |
| | 30 days | 423 | 135 | 125 | 133 | 136 | 367 |
| | 40 days | 589 | 142 | 140 | 142 | 145 | 407 |

Table 10 clearly shows significant increases in the internal impedance of cells prepared by using the LiBF$_4$ solute having concentrations of 0.8 and 1.6 mol/l relative to the number of high-temperature storage days. The proper LiBF$_4$ solute concentration is understood to be within a range from 0.9 to 1.5 mol/l.

(Example-9)

Although the metal cases made of austenite stainless steel, (SUS304; Cr 18%, Ni 8%), have been used as the positive polarity case in Li/(CF)$_n$ system cells in these examples, the high-temperature storage characteristics obtained with these cells were not satisfactory.

Thus, by using positive polarity cases made of ferrite stainless steel of high chromium content and stainless steel to which molybdenum is added, fifty cells of several such stainless steel compositions were prepared as described above with respect to Cell No. 1 of Example-1. After these cells were subjected to a high-temperature storage test conducted for 200 days and at 85° C., the open-circuit voltages were measured. The results of these tests were shown in Table 11.

The results in Table 11 show that a large drop in the open-circuit voltages of Cell No. 1 type cells prepared according to Example 1 and using austenite stainless steel and stored at 85° C. The observations made of the disassembled cells showed corrosion of the bottom of the metal case at the point of contact with the positive electrode. Also, black contamination due to the deposition of impurities appeared on the negative electrode which was made of metallic lithium.

TABLE 11

| Cells | Composition of Stainless Steel Percent by Weight Cr, Ni, and Mo | | Open-Circuit Voltage (V) Storage Days | | |
|---|---|---|---|---|---|
| | | | 0 | 100 | 200 |
| 1 | Cr: 18, Ni: 8 | | 3.40 | 3.15 | 2.90 |
| SS-1 | Cr: 10 | | 3.40 | 3.25 | 2.90 |
| SS-2 | Cr: 15 | | 3.40 | 3.36 | 2.90 |
| SS-3 | Cr: 16 | | 3.40 | 3.37 | 3.15 |
| SS-4 | Cr: 18 | | 3.40 | 3.37 | 3.32 |
| SS-5 | Cr: 18 | | 3.40 | 3.37 | 3.34 |
| SS-6 | Cr: 20 | Mo: 0.5 | 3.40 | 3.37 | 3.34 |
| SS-7 | Cr: 18 | Mo: 0.5 | 3.40 | 3.37 | 3.34 |
| SS-8 | Cr: 18 | Mo: 1.0 | 3.40 | 3.40 | 3.40 |
| SS-9 | Cr: 18 | Mo: 2.0 | 3.40 | 3.40 | 3.40 |
| SS-10 | Cr: 18 | Mo: 3.0 | 3.40 | 3.38 | 3.35 |

Although the drop of open-circuit voltage is observable with the cases made of ferrite system stainless steel and chromium, the observed open-circuit voltage drop is less for the cases made of stainless steel and more than 16 wt % chromium.

With the cells made of stainless steel cases virtually free of nickel but containing more than 15 wt % chromium to which more than 0.5 wt % molybdenum is added, no corrosion of cells was observed after disassembling. Also, no open-circuit voltage drop was observed, thus proving that the substantial effect of using steel and the improved high-temperature storage characteristics.

(Example-10)

BR1225 type Li/(CF)$_n$ system coin-cells were prepared using PPS resin gaskets according to the present invention, separators of glass fiber non-woven cloth having a fiber diameter of less than 2.0 μm, an average fiber weight per unit area of 5.0 to 9.0 g/m$^2$, and an average pore size within a range of 3.0 to 7.5 μm. The cases were prepared of stainless steel containing Cr at 18 wt % and Mo at 2.0 wt %. An electrolyte obtained by dissolving LiBF$_4$ into BL at a concentration of 1.0 mol/l was also prepared. Similar type cells using a gasket made of conventional PP resin, a separator of non-woven PP fiber non-woven cloth, and a case made of stainless steel containing Ni at 1.8 wt % and Cr at 8 wt % were also prepared. The electrolyte included in these cells was obtained by dissolving LiBF$_4$ into a mixture of BL and DME at a concentration of 1.0 mol/l. The other components in these cells are the same as those of Cell No. 1 described above in Example-1.

The two types of cells described above are subjected to a high-temperature storage test in an environment of 150° C. for 40 days, and the open-circuit voltages and the cell weights were determined every 10 days. These tests assume the decreased weight of a cell is due to the loss of electrolyte. The average remaining amount of electrolyte, and the discharge capacity and charge retention capacity at 20° C. and 30 kΩ continuous discharge (obtaining an end voltage of 2.5 V; average of 20 cells) were determined. The results are shown in FIGS. 3 and 4, and Table 12.

TABLE 12

| Kinds Storage Days | Present Invention Cells | | Conventional Cells | |
|---|---|---|---|---|
| | Discharge Capacity (mAh) | Retention Rate of Capacity (%) | Discharge Capacity (mAh) | Retention Rate of Capacity (%) |
| 0 | 48 | 100 | 48 | 100 |
| 10 | 45 | 93 | 5 | 11 |
| 20 | 39 | 81 | 0 | 0 |
| 30 | 36 | 75 | 0 | 0 |
| 40 | 30 | 62 | 0 | 0 |

Figure 3:
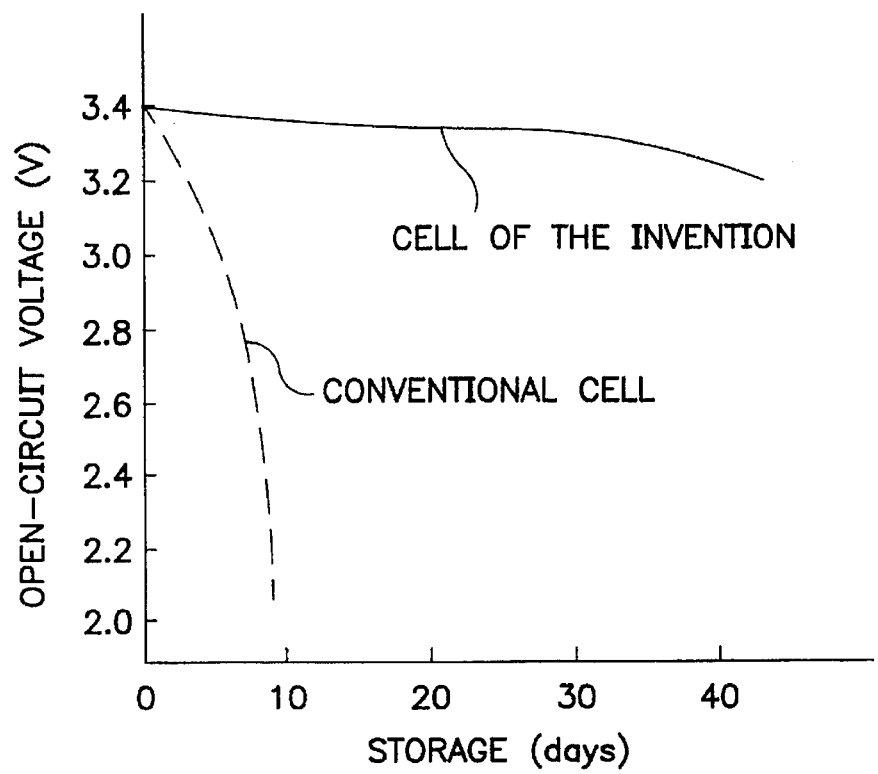
FIG. 3 is a graph showing a relationship between the open-circuit voltage and the storage period at 150° C., for cells according to the present invention and a conventional cell.
Figure 4:
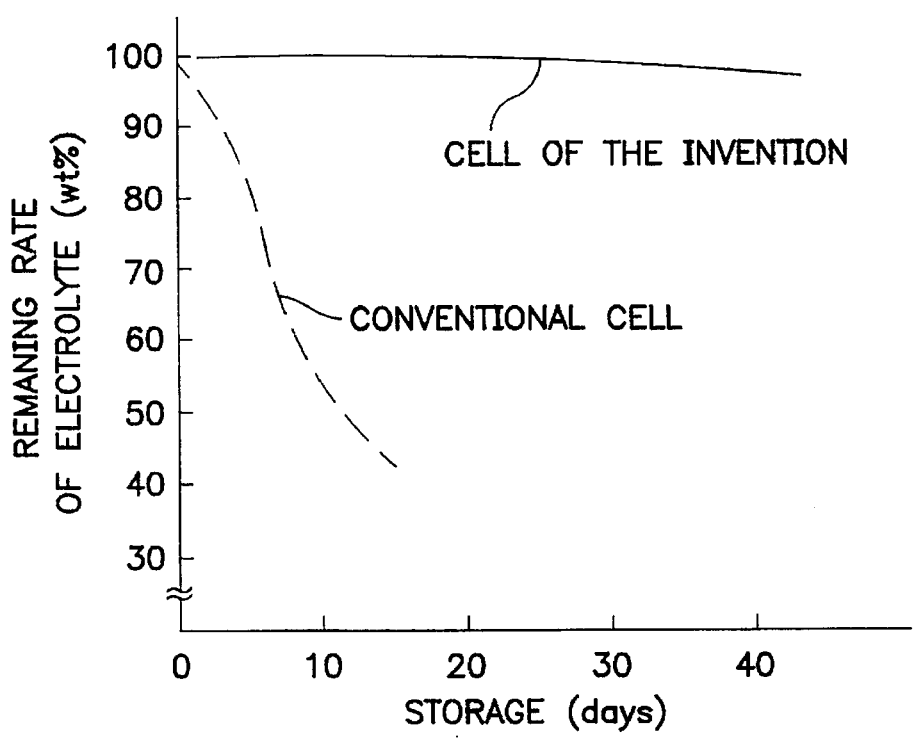
FIG. 4 is a graph showing a relationship between the remaining electrolyte by percent weight, and the storage period at 150° C. for cells according to the present invention and a conventional cell.

As shown in FIG. 3, a rapid decrease of the open-circuit voltage with increasing number of high-temperature storage days was obvious with the conventional cells. This could be related to the remaining amount of electrolyte shown in FIG. 4. This could be further related to the decrease of electrolyte caused by the loss of DME and the deterioration of the lithium negative electrode caused by the corrosion of metal case. As shown in Table 12, in contrast to the retention rate capacity of 0% for conventional cells after storage for 20 days at 150° C., the cells of the present invention showed a retention rate of capacity of 81% after the same storage period, and even 62% after a 40 day storage test.

As described above, the present invention provides general purpose non-aqueous electrolyte cells of high performance. Previously, electrolyte cells capable of long-term use and/or storage in harsh environments and at high temperature had been considered impossible. These characteristics are now realized by using cell components according to the present invention and including a gasket and separator of high heat resistance. The present invention is prepared from industrial materials and benefits from the composite effects of each component.

Furthermore, the present invention successfully expands the uses of general-purpose non-aqueous cells, including the rechargeable cells.

What is claimed is:

1. A non-aqueous electrolyte cell sealed by curling the upper flange of either a metal container of positive polarity or a metal container of negative polarity and by applying a pressure on a gasket consisting essentially of polyphenylene sulfide resin provided with a sealant layer consisting essentially of blown asphalt on the surface of said gasket inserted between said metal container of positive polarity and said metal container of negative polarity, and the positive electrode and negative electrode of said cell are separated by a separator made of glass-fiber non-woven cloth having a fiber diameter of less than 2.0 μm, fiber weight per unit area in a range from 5.0–9.0 g/m$^2$, and an average pore size within a range from 3.0–7.5 μm.

2. A non-aqueous electrolyte cell according to claim 1, using a separator made of glass-fiber non-woven cloth having a average fiber diameter in a range from 0.3–1.5 μm, fiber weight per unit area in a range from 5.0–9.0 g/m$^2$, and an average pore size in a range from 3.0–7.5 μm.

3. A non-aqueous electrolyte cell according to claim 1, using a gasket reinforced by polyphenylene sulfide resin uniformly distributed among glass fiber used as a filler having a fiber content less than 10 wt %.

4. A non-aqueous cell according to claim 1, using a gasket made of polyphenylene sulfide resin in which polyolefine elastomer of polyethylene and/or polypropylene is uniformly blended.

5. A non-aqueous electrolyte cell according to claim 1 wherein the thickness of said gasket on which a compression stress is applied by curling the upper flange of either a metal container of positive polarity or a metal container of negative polarity and sealed by applying a pressure on said gasket, is within a range of 50–90% of the thickness of unstressed gasket determined before it is sealed and compressed.

6. A non-aqueous electrolyte cell according to claim 1, which can be either a primary cell or a secondary cell; wherein a light metal an alloy consisting essentially of a light metal or an intercalation compound formed between an alkaline metal and carbon or metal oxide is used as a negative electrode, and an organic electrolyte obtained by dissolving a solute such as salt of alkaline metal into an organic solvent is used.

7. A non-aqueous electrolyte cell according to claim 1; wherein a sealant layer consisting essentially of blown asphalt is formed by a paint prepared in advance by dissolving blown asphalt and mineral oil into a solvent painted and dried on at least an area of gasket surface contacted with a metal container of positive polarity and a metal container of negative polarity.

8. A non-aqueous electrolyte cell according to claim 1; wherein a positive electrode consisting essentially of graphite fluoride and a negative electrode consisting essentially of metallic lithium are separated by a separator made of glass-fiber non-woven cloth having a fiber diameter less than 2.0 µm, preferably an average fiber diameter within 0.3–1.5 µm, fiber weight per unit area within 5.0–9.0 g/m$^2$, and an average pore size within a range of 3.0–7.5 µm, and a gasket consisting essentially of polyphenylene sulfide resin on which a sealant layer consisting essentially of blown asphalt is disposed between a metal container of positive polarity and a metal container of negative polarity, and where said containers are combined and sealed by curling the upper flange of one of said metal containers by applying pressure on said gasket.

9. A non-aqueous electrolyte cell according to claim 8, using a gasket made of polyphenylene sulfide reinforced by glass fiber acting as a filler blended at a ratio less than 10 wt %.

10. A non-aqueous electrolyte cell according to claim 1, using a gasket made of polyphenylene sulfide to which a polyolefine elastomer of polyethylene and/or polypropylene is added at a ratio less than 10 wt %.

11. A non-aqueous electrolyte cell according to claim 8 wherein the thickness of said gasket on which compression stress is applied by curling the upper edge of either a metal container of positive polarity or a metal container of negative polarity and sealed by applying a pressure on said gasket, is within a range of 50–90% of the thickness of unstressed gasket before it is sealed and compressed.

12. A non-aqueous electrolyte cell according to claim 8; wherein said sealant layer consisting essentially of blown asphalt is formed by painting a paint prepared in advance by dissolving blown asphalt and mineral oil into a solvent on at least an area of gasket surface contacted with a metal container of positive polarity and a metal container of negative polarity, and drying said sealant layer on said gasket.

13. A non-aqueous electrolyte cell according to claim 8, using an organic electrolyte obtained by dissolving a solute of lithium fluoborate into a γ-butylolactone single solvent or a high boiling point mixed solvent consisting essentially of γ-butylolactone at a concentration of 0.9–1.5 mol/l.

14. A non-aqueous cell according to claim 8; wherein said metal container of positive polarity is made of stainless steel containing more than 15 wt % chromium and more than 0.5 wt % molybdenum.

15. A non-aqueous electrolyte cell according to claim 3 wherein the thickness of said gasket on which a compression stress is applied by curling the upper flange of either a metal container of positive polarity or a metal container of negative polarity and sealed by applying a pressure on said gasket, is within a range of 50–90% of the thickness of unstressed gasket determined before it is sealed and compressed.

16. A non-aqueous electrolyte cell according to claim 4 wherein the thickness of said gasket on which a compression stress is applied by curling the upper flange of either a metal container of positive polarity or a metal container of negative polarity and sealed by applying a pressure on said gasket, is within a range of 50–90% of the thickness of unstressed gasket determined before it is sealed and compressed.

17. A non-aqueous electrolyte cell according to claim 9 wherein the thickness of said gasket on which compression stress is applied by curling the upper edge of either a metal container of positive polarity or a metal container of negative polarity and sealed by applying a pressure on said gasket, is within a range of 50–90% of the thickness of unstressed gasket before it is sealed and compressed.

18. A non-aqueous electrolyte cell according to claim 10 wherein the thickness of said gasket on which compression stress is applied by curling the upper edge of either a metal container of positive polarity or a metal container of negative polarity and sealed by applying a pressure on said gasket, is within a range of 50–90% of the thickness of unstressed gasket before it is sealed and compressed.

19. A non-aqueous electrolyte cell according to claim 6, wherein said light metal is lithium.

20. A non-aqueous electrolyte cell according to claim 6, wherein said alkaline metal is lithium.

* * * * *